J. F. WILLIAMS.
CROSSCUT SAW HANDLE.
APPLICATION FILED APR. 1, 1921.
1,422,015.
Patented July 4, 1922.
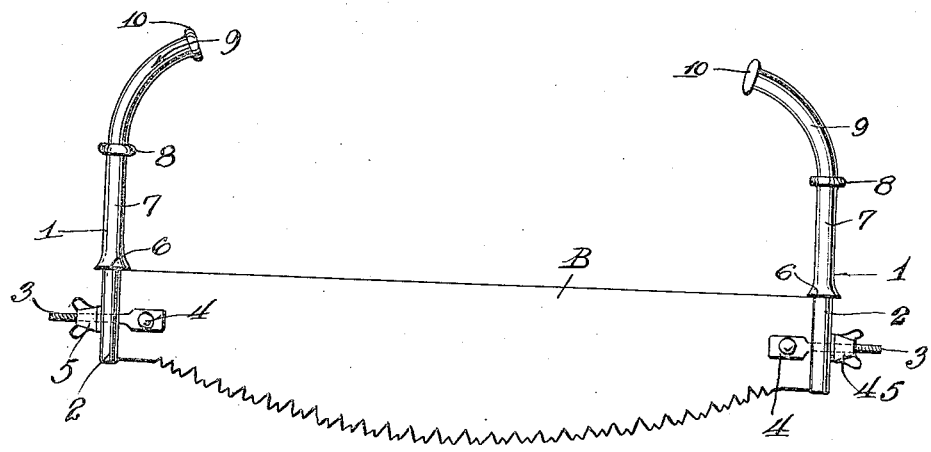
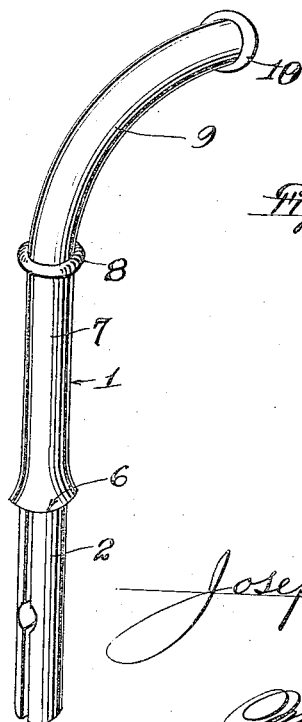

UNITED STATES PATENT OFFICE.

JOSEPH F. WILLIAMS, OF DE FUNIAK SPRINGS, FLORIDA.

CROSSCUT-SAW HANDLE.

1,422,015.  Specification of Letters Patent.  Patented July 4, 1922.

Application filed April 1, 1921. Serial No. 457,726.

*To all whom it may concern:*

Be it known that I, JOSEPH F. WILLIAMS, a citizen of the United States, residing at De Funiak Springs, in the county of Walton and State of Florida, have invented certain new and useful Improvements in a Crosscut-Saw Handle, of which the following is a specification.

This invention relates to cross cut saw handles and more particularly to an improved attachment for cross cut saws whereby the saws may be more easily and conveniently handled.

The primary object of the invention is to provide a separate handle at each end of the saw blade especially designed for reciprocating the saw to cause a maximum effectiveness while the saw is being operated.

One of the objects of the invention is to provide a handle which may be rigidly secured to one end of the saw blade and which will include a curved portion adapted to be gripped by the hand of the user so that the proper pressure may be applied to the saw while it is cutting and so that the proper lift or pull may be exerted on the saw while it is being pulled toward the user.

Other objects of the invention will appear upon consideration of the following detail description and accompanying drawings, wherein:—

Figure 1 is a side elevation of a saw, showing the handles constructed in accordance with my invention, attached to the saw, and Figure 2 is a detail view of one of the handle elements removed from the saw.

The saw blade is of conventional form and it will be obvious that the handle may be applied to any type of saw of the species which require an operator at each end. The handle member consists of a shank 1, one end of which is formed to provide a stud 2 adapted to be secured to the end of the saw blade. A fastening bolt 3 is passed through the stud and is clamped as indicated at 4 to the end of the saw blade while a suitable nut 5 is provided to tighten the saw blade in position on the stud whereby the handle member will be secured in position. The shank, at the upper edge of the saw blade is provided with an enlarged portion forming a shoulder 6, and from this point the shank extends vertically at right angles to the saw blade for a distance sufficient to form a convenient straight hand grip 7 for one hand of the operator. At the upper end of the straight hand grip 7 is an annular flange 8 and from this point the handle is curved as shown to advantage in the drawing to provide a curved upper hand grip 9 terminating in a knob 10. The curved hand grip 9 is substantially semi-circular in formation so that when the operator grasps the handle by placing one hand on the straight hand grip 7 and the other hand on the curved hand grip 9, a slight downward pressure may be exerted without effort on the saw blade while it is being reciprocated. At the same time the curved portion 9 will permit the operator to slightly lift the blade when necessary. The flange 8 and the knob 10 prevents the hand of the user from slipping off the handle while it is being used.

What is claimed is:—

1. A handle for a straight saw blade comprising a shank member having a stud portion at one end to be secured to one end of the saw blade, the shank being extended above the said stud to extend considerably above the upper edge of the saw blade whereby a straight hand grip is provided, the straight portion having its upper end provided with an annular flange, and an inwardly curved hand grip extending from the said flange.

2. A saw blade handle comprising a straight shank having one end secured to the saw blade, the said straight portion of the shank extending considerably above the upper edge of the saw to provide a straight hand grip, an annular flange formed on the upper end of the straight hand grip, a curved hand grip extending from the said flange and curved toward the opposite end of the saw blade, the said curve being substantially quarter-circular, and a knob formed on the terminal of the said curved hand grip.

In testimony whereof I affix my signature.

JOSEPH F. WILLIAMS.